(12) United States Patent
Mayfield

(10) Patent No.: US 6,918,117 B2
(45) Date of Patent: Jul. 12, 2005

(54) APPARATUS AND METHOD FOR DYNAMIC LOAD BALANCING OF MULTIPLE CRYPTOGRAPHIC DEVICES

(75) Inventor: Jimmie Ray Mayfield, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 09/779,370

(22) Filed: Feb. 8, 2001

(65) Prior Publication Data

US 2002/0152374 A1 Oct. 17, 2002

(51) Int. Cl.[7] .................................................. G06F 9/46

(52) U.S. Cl. ....................................... 718/105; 713/156

(58) Field of Search ........................... 718/105; 713/156

(56) References Cited

U.S. PATENT DOCUMENTS

| | | | |
|---|---|---|---|
| 5,694,591 A | 12/1997 | Du et al. | 395/602 |
| 5,727,210 A | 3/1998 | Dwork et al. | 395/674 |
| 5,797,000 A | 8/1998 | Battacharaya | 395/602 |
| 6,026,391 A | 2/2000 | Osborn et al. | 707/2 |

OTHER PUBLICATIONS

Chandra Kopparapu, Load Balancing Servers Firewalls and Caches, 2002, John Wiley and Sons, pp. 28–33.*

* cited by examiner

*Primary Examiner*—Gregory Morse
*Assistant Examiner*—Jacob Lipman
(74) *Attorney, Agent, or Firm*—David A. Mims, Jr.; Rudolf O. Siegesmund (57) ABSTRACT

A method and apparatus for determining the types of tasks in queue at a plurality of cryptographic devices, determining an estimated completion time for each cryptographic device, and assigning tasks to the device with the lowest total estimated completion time for tasks in queue.

23 Claims, 8 Drawing Sheets

APPARATUS AND METHOD FOR DYNAMIC LOAD BALANCING OF MULTIPLE CRYPTOGRAPHIC DEVICES

FIELD OF THE INVENTION

The present invention relates in general to the field of securing electronic transactions through cryptographic operations, and specifically, to the area of assigning tasks to cryptographic devices based upon knowledge of the tasks already in queue at each device and upon knowledge of the estimated completion times for each task by each device.

BACKGROUND OF THE INVENTION

In order to process large numbers of secure electronic transactions, organizations deploy systems consisting of multiple identical cryptographic devices. As used herein, the term cryptographic device means an electrical or electronic contrivance with the purpose of performing one or more cryptographic operations. A cryptographic device may be hardware such as programmable card, or it may be a computer with software instructions for executing the cryptographic operations. A card is an electronic circuit board that is plugged into a slot in a system unit. A cryptographic operation is an action that changes data in order to set up encryption, to perform encryption, to perform decryption, and to verify the accuracy of data. As used herein, cryptographic operations include but are not limited to key generation, encryption, decryption, hash operations and digital signature generation and verification. In order to increase capacity for processing large numbers of cryptographic operations, additional identical cryptographic devices may be added to the system. Cryptographic operations vary significantly in the amount of time required to complete a particular type of operation. A need exists for a way to distribute incoming requests for cryptographic operations among multiple cryptographic devices so that maximum utilization of the devices is achieved.

One method of load-balancing is the "round-robin" method. In the round-robin method, the system cycles through the cryptographic devices, assigning a request to each device in turn. In other words, request A is assigned to device 1's request queue, request B is assigned to device 2's request queue, and so forth. When a request has been assigned to the final device's request queue, the cycle repeats. A modification of this scheme is to first search for an idle device (one that is not currently processing a request) and if found, assign the new request to that device. If no idle devices are found, the classic round-robin scheme is used to assign the request to a device request queue.

The round-robin scheme works well when request processing times are approximately equal. However, if certain requests require vastly more time to process than others, the round-robin method is not satisfactory. For example, consider a system having three cryptographic devices, none of which are idle. Devices 1 and 2 are performing lengthy key-generation operations while device 3 is performing a very fast hash operation. If another request arrives, a round-robin scheme will assign the new request to whichever queue is next in the cycle. However, device 3 is the best choice and will result in the request being processed sooner than if it were assigned to either device 1 or 2.

SUMMARY OF THE INVENTION

The invention which meets the needs identified above is a method and apparatus for determining the types of tasks in queue at a plurality of cryptographic devices, determining an estimated completion time for each cryptographic device, and assigning tasks to the device with the lowest total estimated completion time for tasks in queue. The method requires the system to compute an estimated completion time for each device queue. Incoming requests are then dispatched to the device most likely to become available first. The estimated time value is generally available from the cryptographic hardware manufacturer or it may be gathered empirically. Using this method of "intelligent" load balancing, it is possible to optimize request processing so that higher throughput rates are achieved compared to traditional round-robin approaches.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
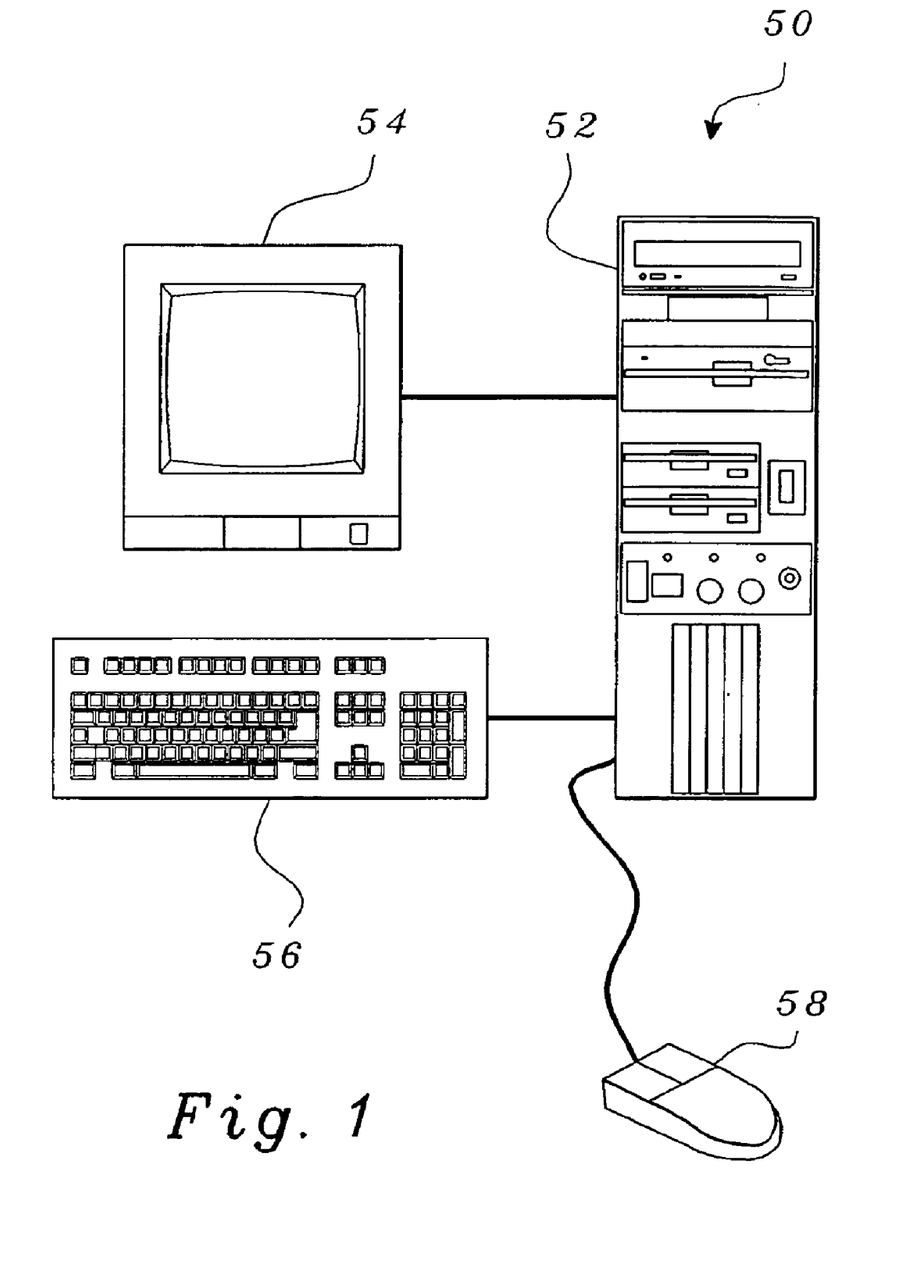
FIG. 1 is depiction of a computer in which the invention may be implemented.

FIG. 1 depicts a personal computer 50 which includes a system unit 52, a video display terminal 54, a keyboard 56, and a mouse 58. Personal computer 50 may be any suitable computer such as an IBM PC computer, a product of International Business Machines Corporation, located in Armonk, N.Y. Although the depicted embodiment involves a personal computer, a preferred embodiment of the present invention may be implemented in other types of data processing systems, such as, for example, intelligent work stations or mini-computers.

Figure 2:
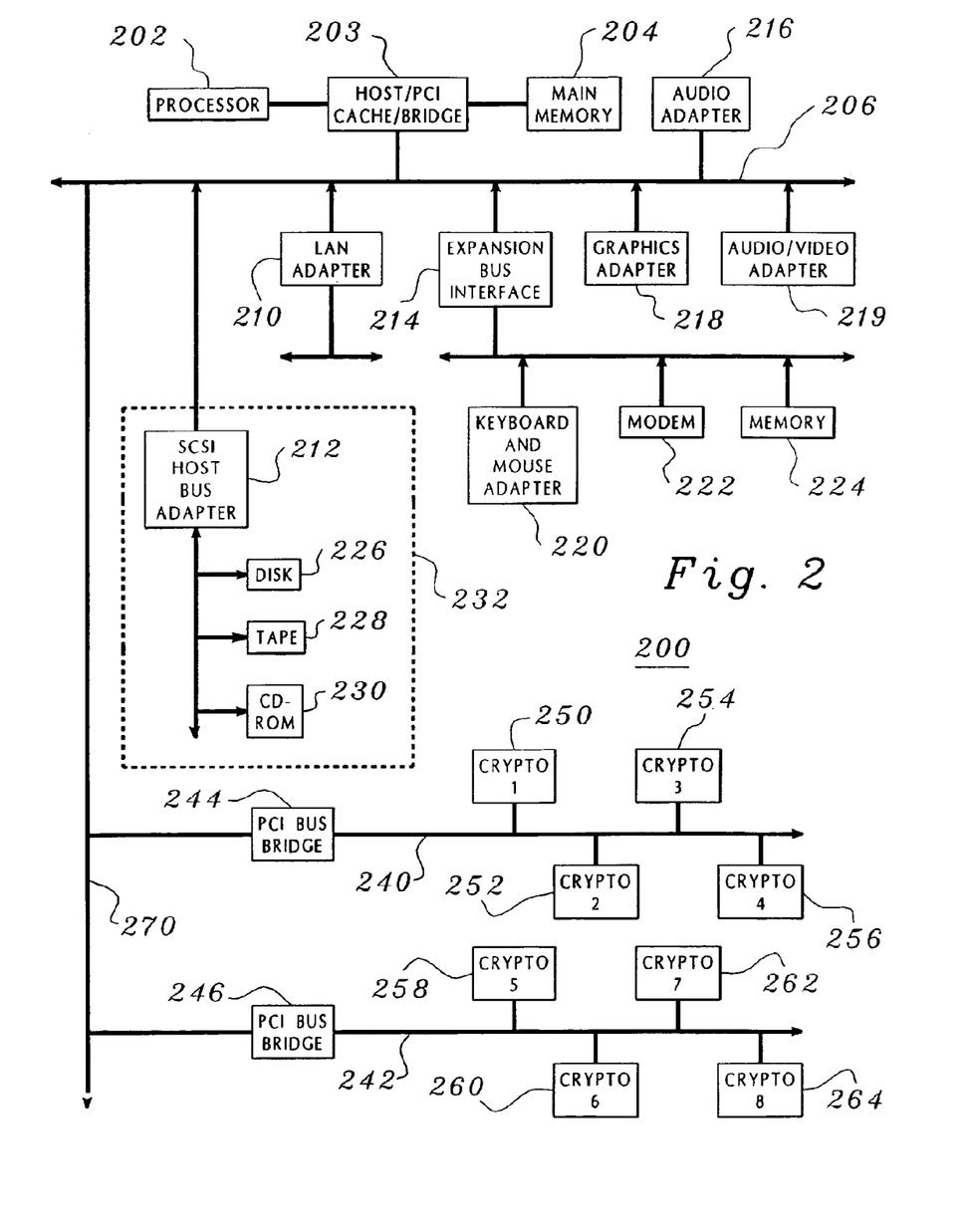
FIG. 2 is a depiction of a data processing system such as the computer of FIG. 1.

FIG. 2 depicts data processing system 200. Data processing system 200 is an example of either a stand-alone computer (such as the personal computer 50 of FIG. 1), if not connected to a distributed data processing system, or a client computer, if connected to a distributed data processing system such as distributed data processing system 300 (See FIG. 3). Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 203. PCI bridge 203 also may include an integrated memory controller and cache memory for Processor 202. Additional connections to PCI local bus 206 may be made through direct component interconnection, through add-in boards, or through connection to PCI bus 270. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Typical PCI local bus implementations will support three or four PCI expansion slots or add-in connectors. Additional PCI bus bridges 244 and 246 provide interfaces for additional PCI buses 240 and 242 connected to System Bus 206 by PCI bus 270. Cryptographic devices (Crypto) 1 through 8 are attached. Crypto 1 250, Crypto 2 252, Crypto 3 254 and Crypto 4 256 are attached to PCI bus 240. Crypto 5 258, Crypto 6 260, Crypto 7 262 and Crypto 8 264 are attached to PCI bus 242.

An operating system runs on processor 202 and is used to coordinate and provide control of various components within data processing system 200 in FIG. 2. The operating system may be a commercially available operating system such as OS/2 which is available from international Business Machines Corporation. "OS/2" is a trademark of international Business Machines Corporation. An object oriented programming system, such as Java, may run in conjunction with the operating system and provides calls to the operating system from Java programs or applications executing on data processing system 200. "Java" is a trademark of Sun Microsystems, Inc. Instructions for the operating system, the object-oriented operating system, and applications or programs may be located on storage devices, such as hard disk drive 226, and they may be loaded into main memory 204 for execution by processor 202. Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system. For example, data processing system 200, if optionally configured as a network computer, may not include SCSI host bus adapter 212, hard disk drive 226, tape drive 228, and CD-ROM 230, as noted by the box with the dotted line in FIG. 3 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 201 comprises some type of network communication interface. As a further example, data processing system 200 may be a Personal Digital Assistant (PDA) device which is configured with ROM and/or flash ROM in order to provide non-volatile memory for storing operating system files and/or user-generated data. The depicted example in FIG. 2 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 3:
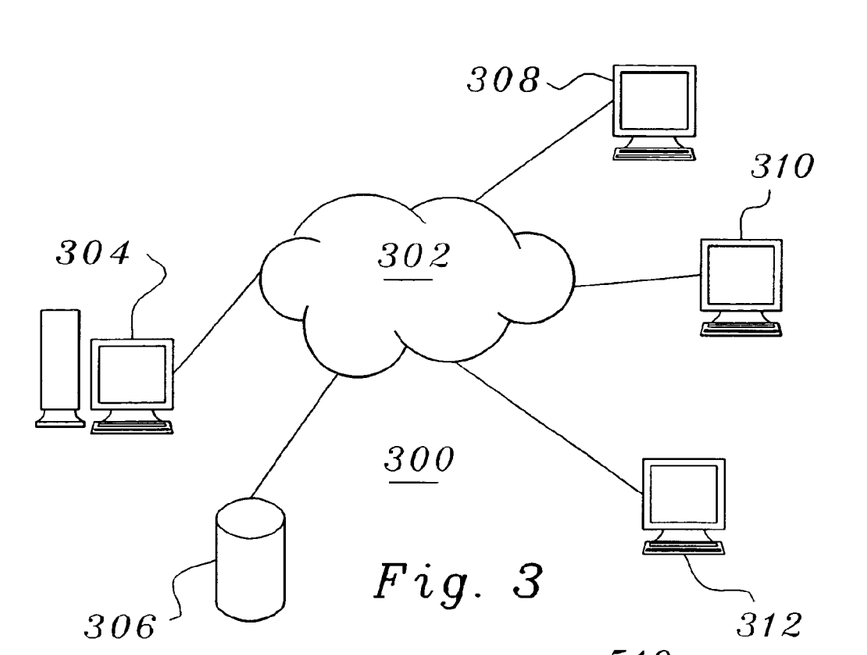
FIG. 3 is a depiction of a distributed data processing system.

FIG. 3 depicts a pictorial representation of a distributed data processing system in which the present invention may be implemented and is intended as an example, and not as an architectural limitation, for the processes of the present invention. Distributed data processing system 300 is a network of computers which contains a network 302, which is the medium used to provide communications links between various devices and computers connected together within distributed data processing system 300. Network 302 may include permanent connections, such as wire or fiber optic cables, or temporary connections made through telephone connections. In the depicted example, a server 304 is connected to network 302 along with storage unit 306. In addition, clients 308, 310, and 312 also are connected to a network 302. Clients 308, 310, and 312 may be, for example, personal computers or network computers.

For purposes of this application, a network computer is any computer, coupled to a network, which receives a program or other application from another computer coupled to the network. In the depicted example, server 304 provides data, such as boot files, operating system images, and applications to clients 308,310 and 312. Clients 308,310, and 312 are clients to server 304. Server 304 may also act as a boot server because it stores the files and parameters needed for booting each of the unique client computers systems 308, 310, and 312. Distributed data processing system 300 may include additional servers, clients, and other devices not shown. In the depicted example, distributed data processing system 300 is the Internet with network 302 representing a worldwide collection of networks and gateways that use the TCP/IP suite of protocols to communicate with one another. Distributed data processing system 300 may also be implemented as a number of different types of networks, such as for example, an intranet, a local area network (LAN), or a wide area network (WAN).

Figure 4:
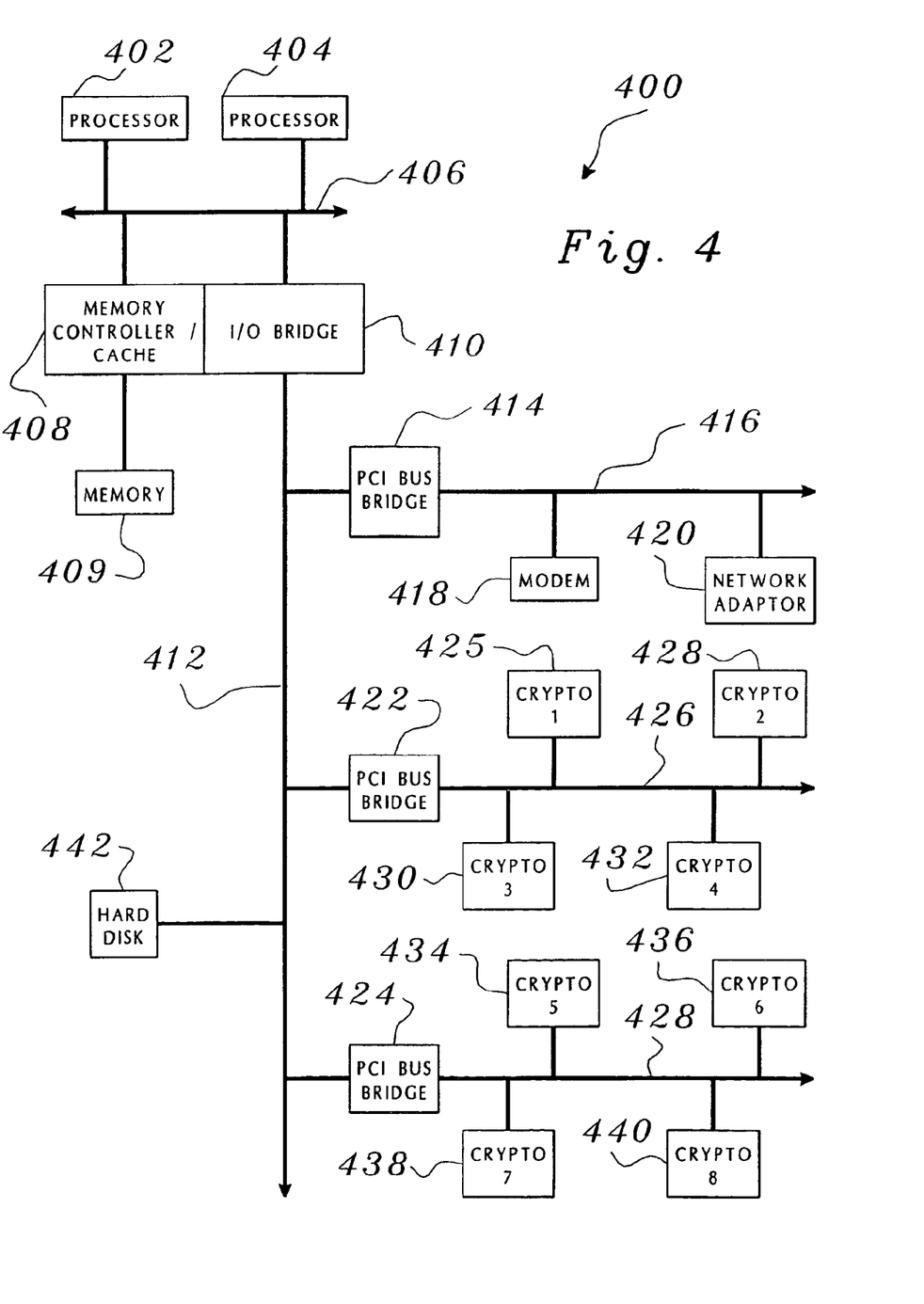
FIG. 4 is a depiction of a server computer in which the invention may be implemented.

Referring to FIG. 4, a block diagram depicts data processing system 400, which may be implemented as a server, such as server 304 in FIG. 3, in accordance with the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted. Peripheral component interconnect (PCI) bus bridge 414 connected to I/O bus 412 provides an interface to PCI local bus 416. Modem 418 may be connected to PCI bus 416. Typical PCI bus implementations will support four PCI expansion slots or add-in connectors. Communications links to a network may be provided through modem 418 and network adapter 420 connected to PCI local bus 416 through add-in boards. Additional PCI bus bridges 422 and 424 provide interfaces for additional PCI buses 426 and 428. Cryptographic devices (Crypto) 1 through 8 are attached. Crypto 1 425, Crypto 2 428. Crypto 3 430 and Crypto 4 432 are attached to PCI bus 422. Crypto 5 434. Crypto 6 436, Crypto 7 438 and Crypto 8 440 are attached to PCI bus 425. A hard disk 432 may also be connected to I/O bus 412 as depicted, either directly or indirectly. Those of ordinary skill in the art will appreciate that the hardware depicted in FIG. 4 may vary. For example, other peripheral devices, such as optical disk drive and the like, also may be used in addition or in place of the hardware depicted. The depicted example is not meant to imply architectural limitations with respect to the present invention. The data processing system depicted in FIG. 4 may be, for example, an IBM RISC/System 6000 system, a product of international Business Machines Corporation in Armonk, N.Y., running the Advanced interactive Executive (AIX) operating system.

Figure 5:
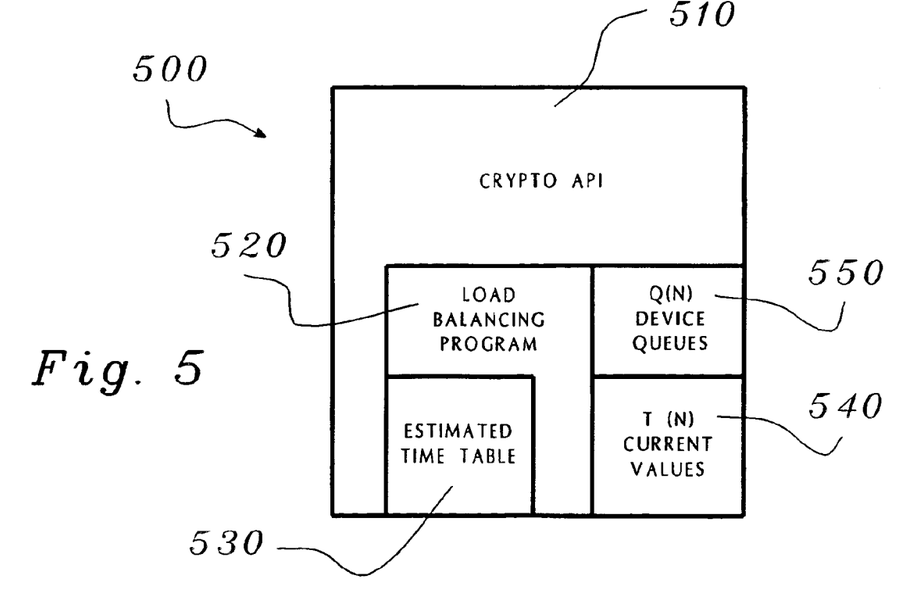
FIG. 5 is a depiction of the cryptographic API containing the present invention.

FIG. 5 depicts cryptographic API 510. Cryptographic API 510 has load balancing program 520. Load balancing program 520 contains estimated time table 530, T(N) current values table 540, and Q(N) device queue table 550. As used herein, T(N) means the estimated time required for device N to completely process all requests currently in device N's request queue. The time units may be seconds, milliseconds, microseconds, or any other time unit that may be desired. As used herein, Q(N) means the number of requests in queue for device N. Q(N) may consist of any number of requests in queue from zero to any upper limit that the programmer may impose on the system.

Table A depicts one possible estimated time table 530. Table A has operations A through R and for each operation an estimated time is given. The estimated time is expressed in units that are the same for each operation. Operations A through R include such operations as key generation, hash operations, encryption operations, decryption operations and digital signature verification.

TABLE A

| A | 14 | G | 3219 | M | 3344 |
|---|---|---|---|---|---|
| B | 156 | H | 34 | N | 862 |
| C | 23 | I | 239 | O | 94 |
| D | 3456 | J | 96 | P | 12 |
| E | 48 | K | 88 | Q | 432 |
| F | 348 | L | 704 | R | 34 |

Table B depicts one possible Q(N) device queue table 550. For each of the 8 cryptographic devices a list of the Queue Items waiting to be performed by that device is shown. As used herein, the term Queue Item means a cryptographic request to be performed by a device. Information included in the Queue Item may include the following: a request type (RT), a timestamp (TS), and an estimated completion time (ECT). As used herein, the term request type means a designation of the type of cryptographic operation that is being requested to be performed by the cryptographic device. As used herein, the term timestamp means the value of the current system time when the device began handling the requests. As used herein, the term estimated completion time means the amount of time required by the cryptographic device to completely perform the requested cryptographic operation.

The Queue Items are represented by QI and a number set representing the device number and the queue position. For example, QI(1,1) represents the queue item at the top of the queue for device 1. QI(1,4) represents the fourth queue item waiting to be processed for device 1. Since each queue item contains RT, the estimated time for each queue item can be determined by reference to estimated time table 530. All Queue Items in the first row are Queue Items that are currently processing. Therefore, Queue Items in the first row have diminishing completion times and a more accurate T(N) can be achieved by updating the completion time for Queue Items in row 1. A subroutine for updating the estimated completion times of Queue Items in row 1, or in other words, Queue Items at the top or queue and currently processing, is discussed below in reference to FIG. 8.

TABLE B

| 1 | 2 | 3 | 4 | 5 | 6 | 7 | 8 |
|---|---|---|---|---|---|---|---|
| QI(1,1) | QI(2,1) | QI(3,1) | QI(4,1) | QI(5,1) | QI(6,1) | QI(7,1) | QI(8,1) |
| QI(1,2) | QI(2,2) | QI(3,2) | QI(4,2) | QI(5,2) | QI(6,2) | QI(7,2) | QI(8,2) |
| QI(1,3) | QI(2,3) | QI(3,3) | QI(4,3) | QI(5,3) | QI(6,3) | QI(7,3) | QI(8,3) |
| QI(1,4) | | QI(3,4) | QI(4,4) | QI(5,4) | QI(6,4) | QI(7,4) | QI(8,4) |
| QI(1,5) | | QI(3,5) | | QI(5,5) | QI(6,5) | QI(7,5) | QI(8,5) |
| | | | | | QI(6,6) | | |
| | | | | | QI(6,7) | | |

Table C shows the estimated time units for each of the operations in queue.

TABLE C

| 1 | 2 | 3 | 4 | 5 | 6 | 7 | 8 |
|---|---|---|---|---|---|---|---|
| 14 | 3219 | 14 | 704 | 94 | 48 | 34 | 239 |
| 14 | 156 | 23 | 34 | 348 | 432 | 704 | 34 |
| 3219 | 23 | 3456 | 14 | 96 | 14 | 3219 | 48 |
| 239 | | 3344 | 14 | 3444 | 14 | 432 | 48 |
| 23 | | 48 | | 14 | 156 | 23 | 156 |
| | | | | | 14 | | |
| | | | | | 14 | | |

Therefore, the total time units for each device is summarized in Table D.

TABLE D

| 1 | 2 | 3 | 4 | 5 | 6 | 7 | 8 |
|---|---|---|---|---|---|---|---|
| 3509 | 3398 | 6885 | 766 | 3996 | 692 | 4412 | 525 |

The next operation would be sent to device 8 because device 8 has the lowest estimated completion time for tasks in queue. Device 2 has the fewest task in queue. However, device 2 has the fifth longest estimated completion time. Device 6 has the most tasks in queue, yet it has second shortest estimated completion time.

Figures 6, 7:
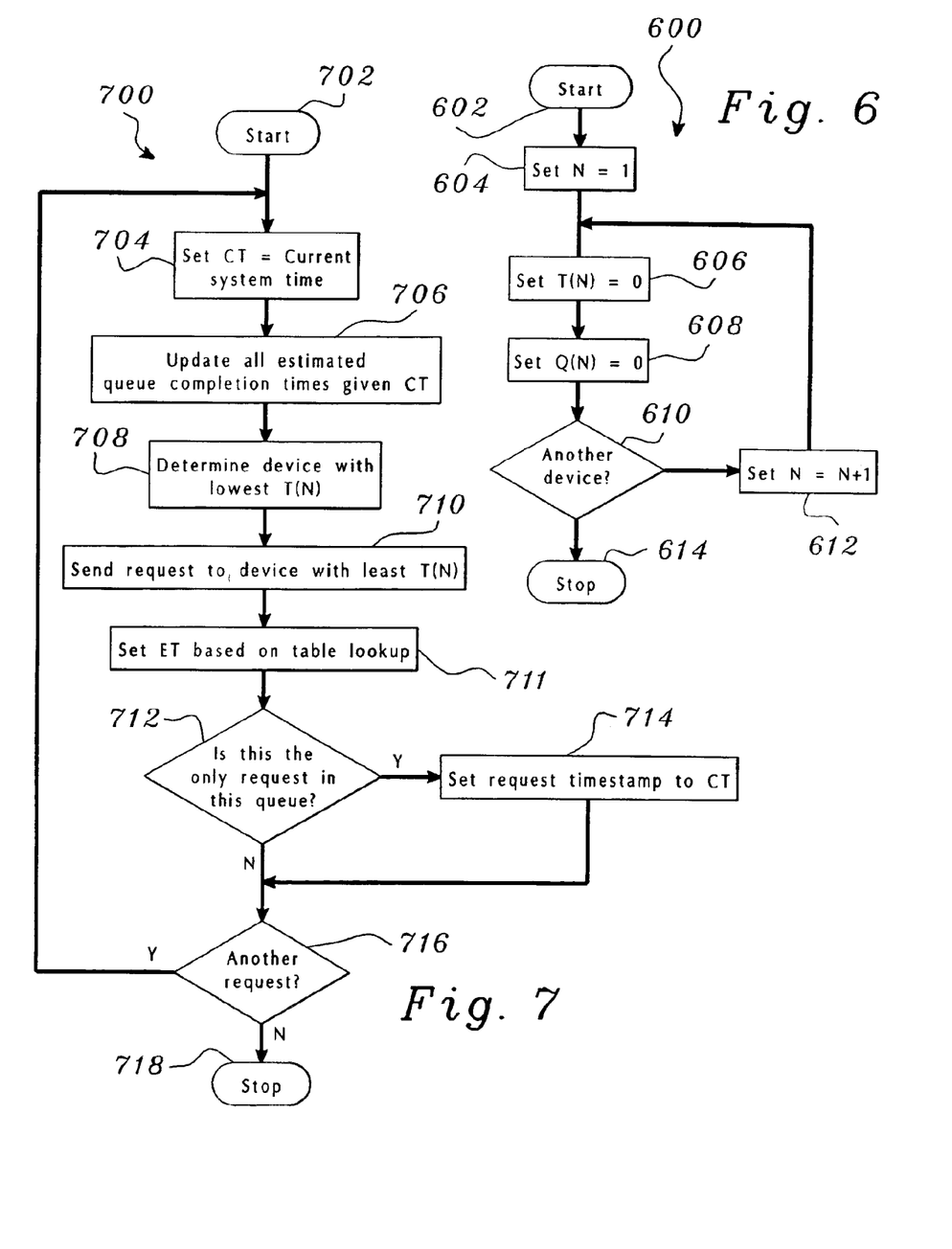
FIG. 6 is a flow chart of the initialization subroutine.
FIG. 7 is a flow chart of the request processing subroutine.

FIG. 6 depicts a flow chart for initialization subroutine 600. Initialization subroutine 600 runs one time, when the load balancing program is first invoked. Initialization subroutine 600 begins (602) and sets N equal to 1 (604). Next, T(N) is set to zero (606). Q(N) is set to 0 (608). Initialization subroutine 600 will determine whether another device is to be queried (610). If another device is to be queried, then N will be set to N+1 (612). If no other devices are to be queried, then initialization subroutine 600 will stop (614).

Figure 8:
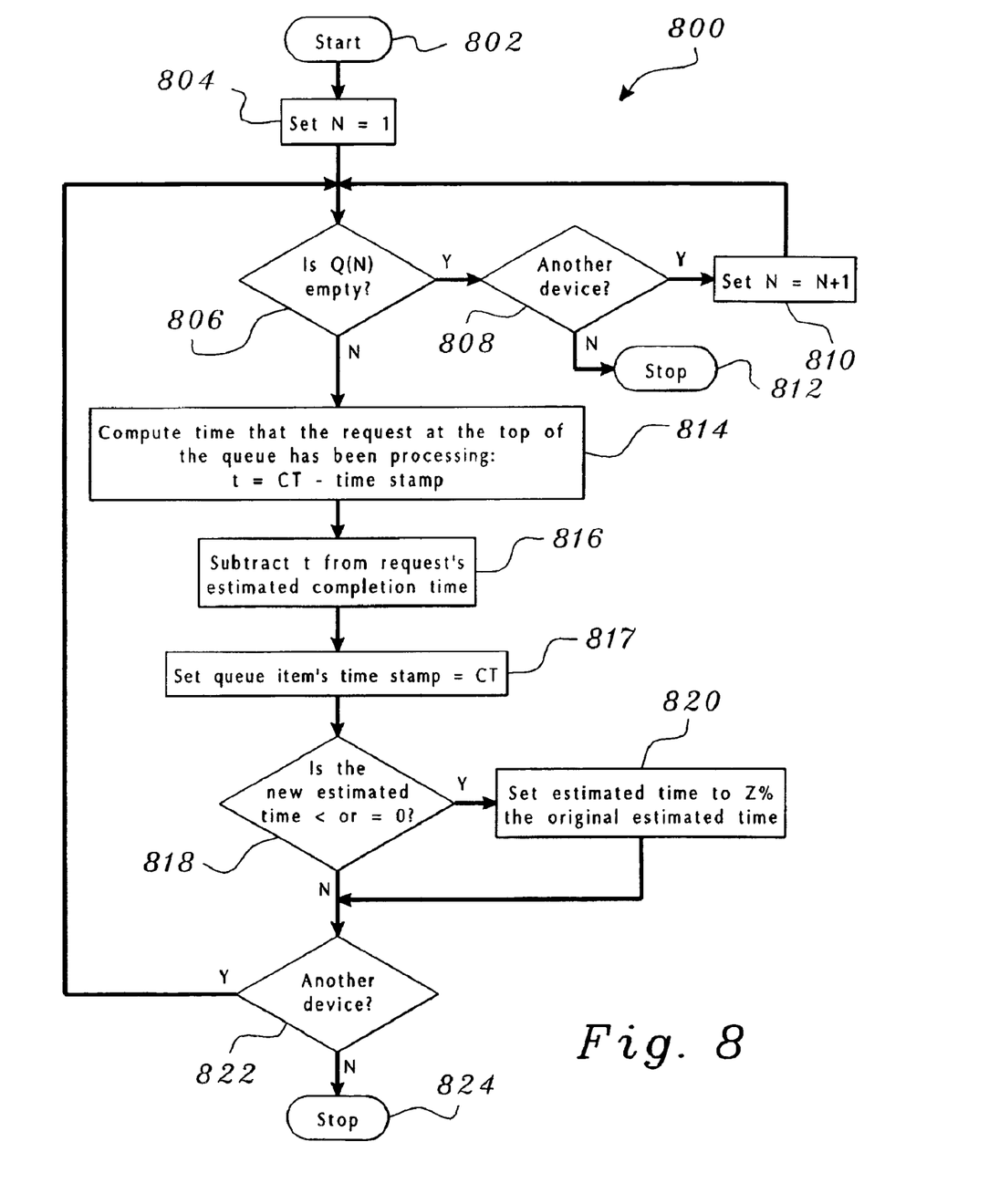
FIG. 8 is a flow chart of the current time update subroutine.
Figure 10:
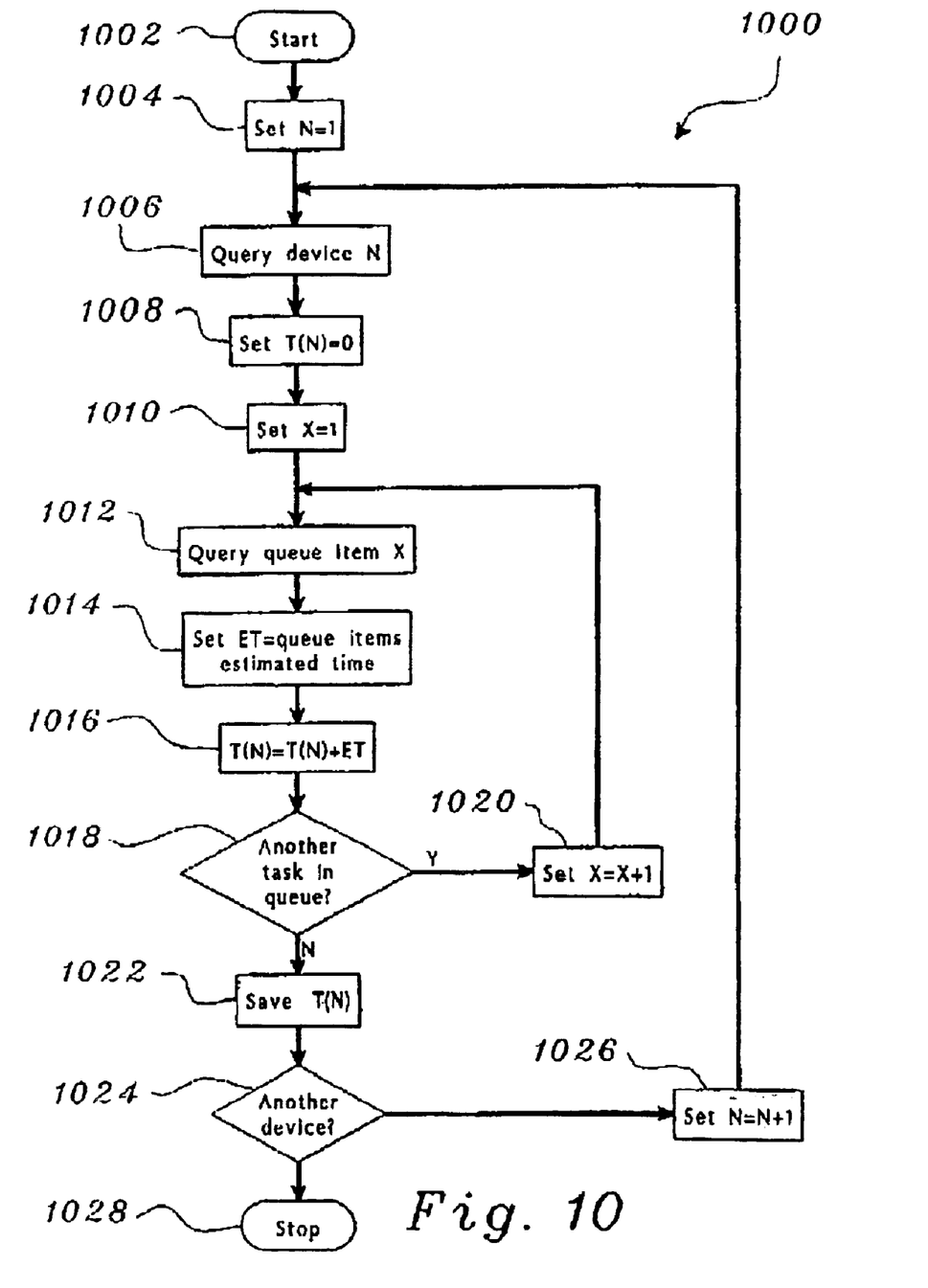
FIG. 10 is a flow chart of the T(N) subroutine.

FIG. 7 depicts a flow chart for request processing subroutine 700. Request processing subroutine 700 begins (702) and sets current time (CT) equal to the current system time (CST) (704). Next, all estimated queue completion times are updated given CT (706). The process for updating queue completion times is shown in FIG. 8. Request processing subroutine 700 next determines which device has the lowest T(N) (708). The process of determining T(N) is shown in FIG. 10. Next, request processing subroutine 700 sends the request to the device with the lowest T(N) (710). ET is set based on reference to the estimated time table (711). Next, a determination is made whether the request, contained in the Queue Item, is the only request in this queue (712). If the request is the only request in this queue, then the request timestamp is set to CT and request processing subroutine 700 goes to step 716. If the request is not the only request in this queue, then request processing subroutine 700 goes to step 716. Step 716 is a determination whether there is another request (716). If there is another request, the process goes to step 704 and cycles through the process. If there is not another request, the process stops (718).

FIG. 8 is a flow chart of update subroutine 800 that updates estimated times given current system time (CT). Update subroutine 800 begins (802) and sets N equal to 1 (804). A determination is made whether Q(N) is empty (806). If Q(N) is empty, a determination is made whether another device is to be queried (808). If another device is to be queried, N is set equal to N+1 (810) and the process returns to step 806. If Q(N) is not empty, then the time "t" is computed (814). Time "t" is the time that the request at the top of the queue has been processing. Time "t" is equal to the value of CT minus the value of the time stamp. Next, "t" is subtracted from the request's estimated completion time (816). The time stamp for the Queue Item being processed is set equal to CT (817). A determination is made whether the new estimated completion time is less than or equal to zero (818). In other words, if the new estimated time is a negative number, a valid value that will update the time for the processing queue item will not be obtained. Therefore, if the new estimated completion time is less than or equal to zero, then the estimated completion time is set to percentage Z of the original estimated completion time (820) and the process goes to step 822. For example, percentage Z may be set at 10 percent. If the new estimated completion time is greater than zero, then the process goes to step 822. Step 822 determines whether there is another device to be queried (822). Ten percent of the processing time is a reasonable estimate. A system administrator could set Z to a more refined number based upon empirical data. If there is another device to be queried, the process goes to step 806 and cycles through the process. If there is not another device to query, then the process stops (824).

An example of the process is shown in the following example based upon a computer with two identical cryptographic devices. In the example, there are two types of cryptographic operations. A key generation operation and a hash operation. The estimated time for either of the cryptographic devices to complete the operations is as follow:

| Key generation: | 1000 ms |
|---|---|
| Hash: | 50 ms |

ECT1=total estimated completion time for queue #1

ECT2=total estimated completion time for queue #2 ect=estimated completion time for a particular queue item

TS=time stamp

CT=current system time

At time t=0, the application begins making cryptographic requests.

| Current System Time (CT) | Request | |
|---|---|---|
| 0 | Key generation | (#1) |
| 500 | Key generation | (#2) |
| 550 | Hash | (#3) |
| 560 | Hash | (#4) |
| 570 | Hash | (#5) |
| 600 | Key generation | (#6) |

Case 1. In case 1 no dynamic estimate update is conducted.

| | |
|---|---|
| CT = 0: | Assign request #1 to queue #1. Now, ECT1 = 1000, ECT2 = 0 (queue #2 is empty) |
| CT = 500 | Assign request #2 to queue #2, which is idle. Now, ECT1 = 1000, ECT2 = 1000 |
| CT = 500 | Both queues have ECT of 1000 so request #3 is assigned to queue #1 Now, ECT1 = 1050, ECT2 = 1000 |
| CT = 560 | ECT2 is less than ECT1 so request #4 is assigned to queue #2 Now, ECT1 = 1050, ECT2 = 1050 |
| CT = 570 | Since both queues have ECT of 1050, request #5 is assigned to queue #1 Now, ECT 1 = 100, ECT2 = 1050 |
| CT = 600 | ECT2 is less than ECT1 so request #5 is assigned to queue #2. Now, ECT1 = 1100, ECT2 = 2050 |

At this point, all request have been dispatched. The queues can be summarized as follows:

queue #1: Key generation (request #1), Hash (request #3), Hash (request #5)

queue #2: Key generation (request #2), Hash (request #4), Key generation (request #6)

| | |
|---|---|
| CT = 1000 | Device #1 finishes request #1 and begins working on request #3 which is the next request in queue. |
| CT = 1050 | Device #1 finishes request #3 and begins working on request #5 which is the final request in its queue. |
| CT = 1100 | Device #1 finishes request #5 and queue #1 is now empty. |
| CT = 1500 | Device #2, finishes request #2 and begins working on request #4 which is the next request in its queue. |
| CT = 1550 | Device #2 finishes request #4 and begins working on request #6 which is the final request in its queue. |
| CT = 2550 | Device #2 finishes request #6 and queue #2 is now empty. |

In Case 1, using load balancing, it takes 2550 ms to process the six requests.

Case 2: Perform dynamic estimate updates
Upon initialization, both device queues are empty

| | |
|---|---|
| CT = 0 | Since both queues are empty, request #1 is assigned to queue #1. Since this is the only queue item in the queue, the queue item's timestamp is set to CT (= 0).<br>Therefore, Queue #1 has one queue item with ect = 1000, TS = 0.<br>Now, ECT1 = 1000, ECT2 = 0 (queue #2 is empty) |
| CT = 500 | Estimated times are updated given current system time.<br>Queue #1: t = (CT − TS) = (500 − 0) = 500<br>ect = (ect − t) = (1000 − 500) = 500<br>The queue item's new TS is set to 500<br>Queue #2 Empty |

Therefore, after the update, ECT=500, ECT2=0 (queue #2 is empty)

| | |
|---|---|
| | Request #2 is assigned to queue #2. Since this is the first request in queue #2, this queue item's timestamp is set to CT (= 500)<br>Now, ECT 1 = 500, ECT2 = 1000 |
| CT = 550 | Estimated times are updated given current system time.<br>Queue #1: t = (CT − TS) = 550 − 500) = 50<br>ect = (ect − t) = (500 − 50) = 450<br>The queue item's new TS is set to 550<br>Queue #2: t = (CT − TS) = (550 − 50) = 50<br>ect = (ect − t) = (1000 − 50) = 950<br>The queue item's new TS is set to 550<br>After the update, ECT = 450, ECT2 = 950.<br>Since ECT1 is less than ECT2, request #3 is assigned to queue #1<br>Now, ECT1 = 450 + 50 = 500 (2 queue items)<br>ECT = 950 (1 queue item) |
| CT = 560 | Estimated times are updated given current system time.<br>Queue #1: t = (CT − TS) = (560 − 550) = 10<br>ect = (ect − t) = (450 − 10) = 430<br>The queue item's new TS is set to 560<br>Queue #2 t = (CT − TS) = (560 − 550) = 10<br>ect = (ect − t) = (950 − 10) = 940<br>The queue item's new TS is set to 560<br>After the update, ECT1 = 440 + 50 = 490 (2 queue items)<br>ECT2 = 940 (1 queue item)<br>Since ECT1 is less than ECT2, request #4 is assigned to queue #1<br>Now, ECT1 = 440 + 50 + 50 = 540 (3 queue items in queue #1)<br>ECT2 = 940 (1 queue item in queue #2) |
| CT = 570 | Estimated times are updated given current system time.<br>Queue #1 t = (CT − TS) = (570 − 560) = 10<br>ect = (ect − t) = 440 − 10 = 430<br>The queue item's new TS is set to 570<br>Queue #2 t = (CT − TS) = (570 − 560) = 10<br>ect = (ect − t) = (440 − 10) = 930<br>The queue item's new TS is set to 570<br>Therefore, after the update, ECT1 = 430 + 50 + 50 = 530 (3 queue items)<br>ECT2 = 930 (1 queue item)<br>Since ECT1 is less than ECT2, request #5 is assigned to queue #1.<br>Now, ECT1 = 430 + 50 + 50 + 50 = 580 (4 queue items in queue #1)<br>ECT2 = 930 (1 queue item in queue #2) |
| CT = 600 | Estimated times are updated given current system time.<br>Queue #1: t = (CT − TS) = (600 − 570) = 30<br>ect = (ect − t) = (430 − 30) = 400<br>The queue item's new TS is set to 600<br>Queue #2 t = (CT − TS) = (600 − 570) = 30<br>ect = (ect − t) − (930 − 30) = 900<br>The queue item's new TS is set to 600<br>After the update, ECT1 = 400 + 50 + 50 + 50 = 550<br>ECT2 = 900<br>Since ECT1 is less than ECT2, request #6 is assigned to queue #1.<br>Now, ECT1 = 400 + 50 + 50 + 50 + 1000 = 1550<br>ECT2 = 900 |

At this point, all of the requests have been dispatched. The queues can be summarized as follows:
queue #1: request #1, request #3, request #4, request #5, request #6
queue #2: request #2

| | |
|---|---|
| CT = 1000 | Device #1 finishes request #1 and begins working on request #3. |
| CT = 1050 | Device #1 finishes request #1 and begins working on request #4. |
| CT = 1150 | Device #1 finishes request #5 and begins working on request #6. |
| CT = 1500 | Device #2 finishes request #2, queue #2 is empty. |
| CT = 2150 | Device #1 finishes request #6, queue #1 is empty. |

Therefore, using the load balancing method of case 2, it takes 2150 ms to process the six request. The method of dynamically updated the estimated times save 400 ms or roughly 16 percent.

Figure 9:
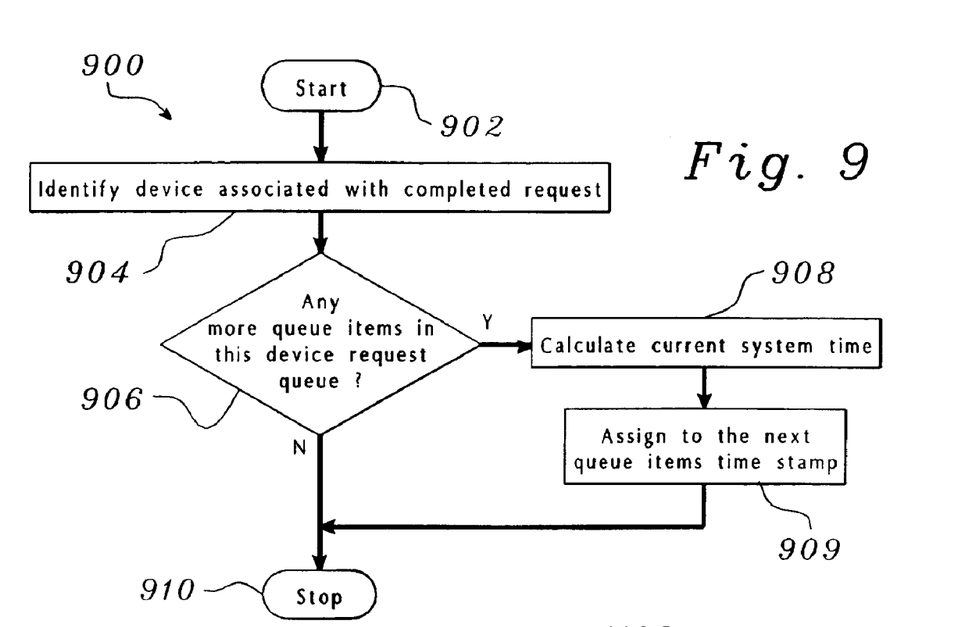
FIG. 9 is a flow chart of the request completion subroutine.

FIG. 9 depicts a flow chart for request completion subroutine 900. Request completion subroutine 900 begins (902) and the device associated with the completed request is determined (904). A determination is made as to whether there are any more requests in this device request (906). If there are more requests, the current system time is calculated (908). After the current system time is calculated, the current system time is assigned to the next request's time stamp (909) and the process ends (910). If there are no more requests in this device request, the request completion subroutine ends (910).

FIG. 10 depicts a flow chart for the process of computing T(N). The program begins (1002) and N is set to equal 1 (1004). Next, the program queries device N (1006). In other words, when N is equal to 1, device 1 will be queried. T(N) is then set to equal 0 (1008). X is set equal to 1 (1010). Queue Item X is queried (1012). In other words, when X is set equal to 1, queue item 1 will be queried. Next, ET is set equal to the estimated time value for queue item X (1014). T(N) is then set equal to T(N) plus ET (1016). Next, a determination is made as to whether or not there is another task in queue (1018). If there is another task in queue, X is set equal to X plus 1, and the program goes to step 1012. If there is not another task in queue, the program proceeds to the next step which is to save T(N) (1022). A determination is made as to whether or not there is another device to query (1024). If there is another device to query, N is set equal to N plus 1 (1026). If there is not another device to query, the program will sop (1028).

Figure 11:
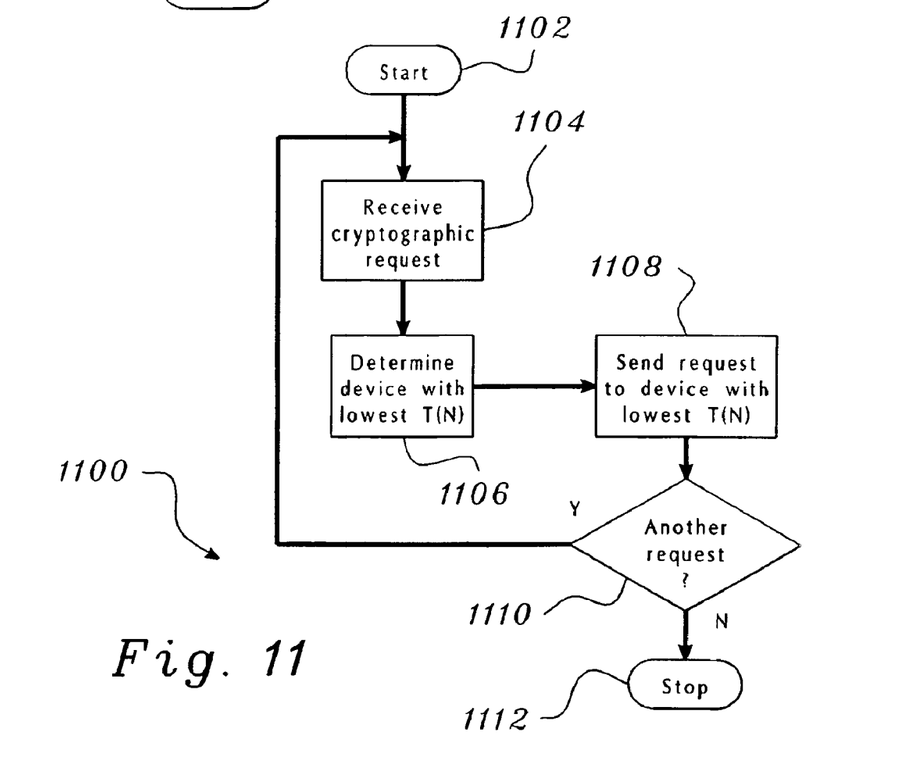
FIG. 11 is a flow chart of the load balancing program.

FIG. 11 depicts load balancing program (1100) of the cryptographic API. The program starts (1102). A cryptographic request is received from one of the applications served by the cryptographic API (1104). The program then determines the device with the lowest T(N). The values of T(N) have been calculated by the T(N) subroutine and saved in a table such as Table D in the example above. Therefore, the load balancing program selects the device with the lowest T(N) and sends the request to the device with the lowest T(N) (1108). A determination is made as to whether there is another request (1110). If there is another request, the program goes to step 1104 and the request is received (1104). If there is not another request, the program ends (1112).

It is important to note that while the present invention has been described in the context of a program implemented in a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed:

1. A method for distributing cryptographic requests to a plurality of cryptographic devices comprising:

receiving a cryptographic request;

determining a lowest T(N); and sending the cryptographic request to a cryptographic device with the lowest T(N);

wherein a T(N) represents an estimated time for a cryptographic device N to completely process all of a plurality of requests currently in a Q(N); and wherein the Q(N) represents a number of requests in a queue for a cryptographic device N's request queue in a Q(N) device queue table.

2. The method of claim 1 further comprising:

determining whether there is a second cryptographic request; and responsive to a determination that there is a second cryptographic request, determining a new lowest T(N); and sending the second cryptographic request to a cryptographic device with the new lowest T(N).

3. The method of claim 1 further comprising:

setting an N equal to 1;

setting the T(N) equal to 0;

setting the Q(N) equal to 0;

determining whether there is another device to query; and responsive to a determination that there is another device to query, setting the N equal to the N plus 1 and returning to the step of setting the T(N) equal to 0.

4. The method of claim 1 further comprising:

setting a current time equal to a current system time; and updating all of a plurality of estimated queue item completion times.

5. The method of claim 1 further comprising:

setting an estimated time from an estimated time table;

determining whether a queue item is an only queue item in a queue; and responsive to a determination that the queue item is the only queue item in the queue setting a queue item timestamp to a current time.

6. The method of claim 1 further comprising:

setting the N equal to 1;

determining whether the Q(N) is empty;

responsive to a determination that the Q(N) is empty, determining whether there is another cryptographic device;

responsive to a determination that there is another cryptographic device, setting the N equal to the N plus 1 and returning to the step of determining whether the Q(N) is empty;

computing a t where the t is the time a request in a queue item at the top of a queue has been processing, by subtracting a time stamp from a current time;

subtracting the t from the a queue item's estimated completion time;

determining whether a new estimated completion time is less than or equal to zero;

responsive to a determination that the new estimated completion time is less than or equal to zero, setting an estimated time to a percent of an original estimated time.

7. The method of claim 1 further comprising:

identifying a cryptographic device associated with a queue item with a completed request;

determining whether there are more queue item's in a queue for the cryptographic device N; and responsive to a determination that there are more queue item's in a queue for the cryptographic device N, calculating a current system time and assigning the current system time to the a next queue item's timestamp.

8. A programmable apparatus for balancing the load of requests for cryptographic operations sent to a plurality of identical cryptographic devices comprising:

a computer having a processor, a memory, a plurality of PCI buses, and a plurality of cryptographic devices connected to said PCI buses;

a cryptographic API installed on said computer;

a load balancing program in said cryptographic API;

a estimated completion time subroutine in said load balancing program;

wherein, said estimated completion time subroutine directs said processor to determine a lowest T(N); and wherein, responsive to determining the lowest T(N), sending a request for a cryptographic operation to a cryptographic device with the lowest T(N);

wherein a T(N) represents an estimated time for a cryptographic device N to completely process a plurality of requests currently in a Q(N); and wherein the Q(N) represents a number of requests in a queue for the cryptographic device N's request queue in a Q(N) device queue table.

9. The programmable apparatus of claim 8 further comprising an initialization subroutine in said load balancing program that directs said processor to set the N equal to 1, set the T(N) equal to 0, and to set the Q(N) equal to 0.

10. The programmable apparatus of claim 8 further comprising a subroutine in the load balancing program that sets a current time equal to a current system time and that updates all of a plurality of estimated queue item completion times.

11. The programmable apparatus of claim 8 further comprising a subroutine in the load balancing program that sets an estimated time from an estimated time table, determines whether a queue item is an only queue item in a queue, and responsive to a determination that the queue item is the only queue item in the queue, sets a queue item timestamp to a current time.

12. The programmable apparatus of claim 8 further comprising a subroutine in the load balancing program that computes a t where the t is a time that a request in a queue item at a top of a queue has been processing, by subtracting a time stamp from a current time.

13. The programmable apparatus of claim 8 further comprising a subroutine in the load balancing program that sets the N equal to 1, determines whether the Q(N) is empty, responsive to a determination that the Q(N) is empty, determines whether there is another device, responsive to a determination that there is another device, sets the N equal to the N plus 1, computes the t, where the t is a time that a request in a queue item at a top of a queue has been processing, by subtracting a time stamp from a current time, subtracts the t from a queue item's estimated completion time, determines whether a new estimated completion time is less than or equal to zero, and responsive to a determination that the new estimated completion time is less than or equal to zero, sets the estimated time to a Z percent of an original estimated time.

14. The programmable apparatus of claim 8 further comprising a subroutine in the load balancing program that identifies a cryptographic device associated with a queue item with a completed request, determines whether there are more queue item's in a queue for the cryptographic device, and responsive to a determination that there are more queue items in the queue for the cryptographic device, calculating a current system time and assigning the current system time to a next queue item's timestamp.

15. A computer readable memory for causing a computer to balance the load of requests for cryptographic operations sent to a plurality of cryptographic devices comprising:
    a load balancing program stored in said memory;
    the memory, so configured by said load balancing program, responsive to receiving a request for a cryptographic operation, causes the computer to determine a lowest T(N), and to send the cryptographic request to a cryptographic device with the lowest T(N);
wherein a T(N) represents an estimated time for a cryptographic device N to completely process a plurality of requests currently in a Q(N); and
wherein the Q(N) represents a number of requests in a queue for the cryptographic device N's request queue in a Q(N) device queue table.

16. The computer readable memory of claim 15 wherein the load balancing program comprises an initialization subroutine in said load balancing program that causes said computer to set the N equal to 1, to set the T(N) equal to 0, and to set the Q(N) equal to 0.

17. The computer readable memory of claim 15 wherein the load balancing program comprises a subroutine that sets a current time equal to a current system time and that updates all of a plurality of estimated queue item completion times.

18. The computer readable memory of claim 15 wherein the load balancing program further comprises a subroutine that sets an estimated time from an estimated time table, determines whether a queue item is an only queue item in a queue, and responsive to a determination that the queue item is the only queue item in the queue, sets the queue item timestamp to a current time.

19. The computer readable memory of claim 15 wherein the load balancing program comprises a subroutine in the load balancing program that computes a t where the t is a time a request in a queue item at a top of a queue has been processing, by subtracting a time stamp from a current time.

20. The computer readable memory of claim 15 wherein the load balancing program further comprises a subroutine that sets an N equal to 1, determines whether the Q(N) is empty, responsive to a determination that the Q(N) is empty, determines whether there is another device, responsive to a determination that there is another device, sets the N equal to the N plus 1, computes a t, where the t is a time that a request in a queue item at a top of a queue has been processing, by subtracting a time stamp from a current time, subtracts the t from the queue item's estimated completion time, determines whether a new estimated completion time is less than or equal to zero, and responsive to a determination that the new estimated completion time is less than or equal to zero, sets an estimated time to percent of an original estimated time.

21. The computer readable memory of claim 15 wherein the load balancing program further comprises a subroutine that identifies a cryptographic device associated with a queue item with a completed request, determines whether there are more queue item's in a queue for the cryptographic device, and responsive to a determination that there are more queue item'in the queue for the cryptographic device, calculating a current system time and assigning the current system time to a next queue item's timestamp.

22. A computer implemented process to balance the load of requests for cryptographic operations sent to a plurality of cryptographic devices, comprising: using a computer, performing the following series of steps:
    receiving a cryptographic request;
    setting an N equal to 1;
    setting a T(N) equal to 0;
    setting a Q(N) equal to 0;
    determining whether the Q(N) is empty;
    responsive to a determination that the Q(N) is empty, determining whether there is another device;
    responsive to a determination that there is another device, setting the N equal to the N plus 1 and returning to the step of determining whether the Q(N) is empty;
    computing a t where the t is a time a request at a top of a queue has been processing by subtracting a time stamp from a current time;
    subtracting the t from a cryptographic request's estimated completion time;
    determining whether a new estimated completion time is less than or equal to zero;
    responsive to a determination that the new estimated completion time is less than or equal to zero, setting an estimated time to a Z percent of an original estimated time;
    responsive to a determination that the new estimated time is greater than zero, determining whether there is another device to query;
    responsive to determining that there is another device to query, returning to the step of determining whether the Q(N) is empty; and
    identifying the a cryptographic device associated with a completed request;
    determining whether there are more queue items in a queue;
    responsive to a determination that there are more queue items in the queue, calculating a current system time and assigning the current system time to a next queue item's timestamp;

setting a current time equal to a current system time;

updating all of a plurality of estimated completion times;

determining a cryptographic device with a lowest T(N); and sending the cryptographic request to a device with the lowest T(N);

wherein the T(N) represents an estimated time for a cryptographic device N to completely process a plurality of requests currently in the Q(N);

wherein the Q(N) represents a number of requests in a queue for the cryptographic device N's request queue in a Q(N) device queue table; and wherein the Z is determined by an administrator.

23. The computer implemented process of claim 22 further comprising:

determining whether there is another device to query;

responsive to a determination that there is another device to query, setting N equal to N plus 1 and returning to the step of setting the T(N) equal to 0, determining whether there is a second cryptographic request;

responsive to a determination that there is a second cryptographic request, determining a new lowest T(N); and sending the second cryptographic request to a cryptographic device with the lowest T(N).

* * * * *

UNITED STATES PATENT AND TRADEMARK OFFICE
CERTIFICATE OF CORRECTION

PATENT NO. : 6,918,117 B2
DATED : July 14, 2005
INVENTOR(S) : Mayfield

It is certified that error appears in the above-identified patent and that said Letters Patent is hereby corrected as shown below:

<u>Column 12,</u>
Line 11, "from the a" should be -- from a --.
Line 28, "the" should be deleted.

<u>Column 14,</u>
Line 23, "item'" should be -- item's --.

Signed and Sealed this

Twenty-third Day of August, 2005

JON W. DUDAS
*Director of the United States Patent and Trademark Office*